(12) United States Patent
Lindsley et al.

(10) Patent No.: US 6,317,659 B1
(45) Date of Patent: Nov. 13, 2001

(54) LAYERED SUBSYSTEM ARCHITECTURE FOR A FLIGHT MANAGEMENT SYSTEM

(75) Inventors: Steven Edward Lindsley; Richard Dean Clement; James F. McAndrew; Angela Grace Morgan, all of Albuquerque; Kenneth Michael Munoz, Rio Rancho, all of NM (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/458,364

(22) Filed: Dec. 9, 1999

(51) Int. Cl.[7] .................................................... G06F 17/00
(52) U.S. Cl. ................................ 701/1; 701/14; 701/24; 244/75 R; 244/175
(58) Field of Search ................................. 701/1, 14, 24; 244/75 R, 76 R, 175

(56) References Cited

U.S. PATENT DOCUMENTS

| | | | |
|---|---|---|---|
| 4,642,775 | * | 2/1987 | Cline et al. ........................... 701/200 |
| 5,111,400 | * | 5/1992 | Yoder ..................................... 701/3 |
| 5,475,594 | * | 12/1995 | Oder et al. ............................. 701/14 |
| 5,606,500 | * | 2/1997 | Tran ........................................ 701/1 |
| 5,739,769 | * | 4/1998 | Vladimir et al. ..................... 340/945 |
| 5,761,625 | | 6/1998 | Honcik et al. .......................... 701/14 |
| 5,796,612 | * | 8/1998 | Palmer . |
| 5,890,079 | | 3/1999 | Levine ................................... 701/14 |
| 6,085,129 | * | 7/2000 | Schardt et al. ......................... 701/14 |
| 6,094,608 | * | 7/2000 | Bomans et al. ........................ 701/14 |
| 6,112,140 | * | 8/2000 | Hayes et al. ........................... 701/14 |
| 6,112,141 | * | 8/2000 | Briffe et al. ............................ 701/14 |
| 6,122,575 | * | 9/2000 | Schmidt et al. ........................ 701/29 |
| 6,163,743 | * | 12/2000 | Bomans et al. .......................... 701/3 |

FOREIGN PATENT DOCUMENTS

WO 00/55770    3/2000  (WO) .............................. G06F/17/40

* cited by examiner

Primary Examiner—William A. Cuchlinski, Jr.
Assistant Examiner—Olga Hernandez
(74) Attorney, Agent, or Firm—Loria B. Yeadon

(57) ABSTRACT

An improved aircraft flight management system (FMS) based on a layered subsystem architecture, residing on a computing platform and including an operator interface subsystem, a communications subsystem, a flight management subsystem, and a database management subsystem, wherein the architecture is predicated on the enforcement of subsystem-dependency rules wherein a given subsystem is allowed to depend only upon another subsystem in the same or lower hierarchical layer.

29 Claims, 8 Drawing Sheets

FMS CONTEXT DIAGRAM

FMS CONTEXT DIAGRAM

FIG-3 HEIRARCHICAL TOP-LEVEL FUNCTIONAL VIEW

FMS HIERARCHICAL VIEW

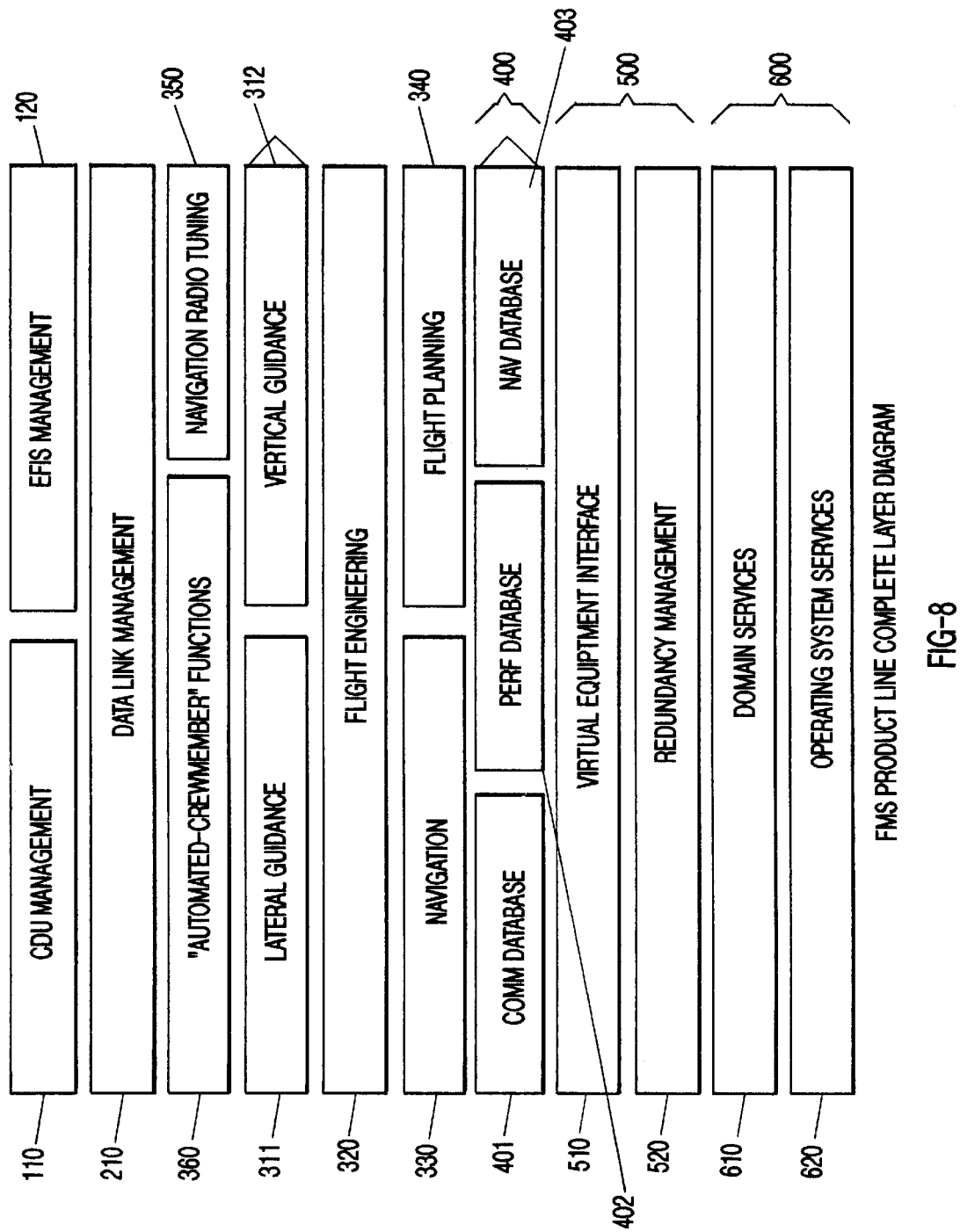
FIG-8 FMS PRODUCT LINE COMPLETE LAYER DIAGRAM

LAYERED SUBSYSTEM ARCHITECTURE FOR A FLIGHT MANAGEMENT SYSTEM

CROSS-REFERENCE TO RELATED APPLICATIONS

Not applicable.

BACKGROUND OF THE INVENTION

The present invention is generally related to flight management systems. More particularly, the present invention related to a flight management system architecture composed of a full-featured flight management system that extends a single architecture to diverse systems (e.g., communication, controllers, monitoring, data link, etc.) that are normally independently managed and not easily integratable into a flight management system architecture.

Existing flight management systems (FMS) are notoriously difficult to modify and maintain. History has generally shown that development programs that are executed strictly on the basis of reused code from existing flight management systems have unacceptably long development schedules and, therefore, excessively high development costs. Furthermore, if there are several development programs being executed concurrently, there are frequent occasions where two or more development teams are performing similar development tasks with low possibility of taking advantage of each other's work. Long development schedules, cost overruns, and lack of team synergy can all be attributed to a single characteristic of the existing systems' lack of a well documented and/or easily extensible software architecture.

Because there are generally few software architectures that are well thought-out and documented with regard to multi-system management within a flight management architecture, the primary artifact that can be used during development of new programs is code. Without software architecture, modifications are made to the code from the software developer's perspective in order to implement new requirements. Often, software requirements that are used as the basis for implementation do not reflect the original problem being solved or the original capability being added. This leads to a software solution that can be virtually incomprehensible from a user's standpoint. Over time, as changes upon changes are made, the implementation becomes an unmanageable conglomeration of software modules that all have the potential to depend on each other. When this occurs, the result is typically "spaghetti-code." Further complicating the issue can be the fact that there are several FMS programs executing simultaneously. Because of the development process just described (basically, code-based), as soon as one program makes a change, it can be virtually impossible for that program to take advantage of desirable changes that have been made on one of the other programs or modules. Therefore, it can be entirely possible that the personnel on two or more program teams are working on the same problem at the same time and are not generally able to collaborate.

SUMMARY OF THE PRESENT INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

There is a need for an interface that allows for the compatibility of various flight-related modules that is not being met today. The present invention provides an improved flight management system (FMS) architecture that can be compatible with various pieces of flight-related equipment and can integrate controls modules or various aspects of flight operations and/or equipment and/or manages the modules within the entire FMS system as a product line.

One aspect of the present invention can be an FMS architecture that enables diverse subsystems at associated subsystems to interface based on defined dependencies and/or subsystem hierarchy. The FMS is responsible for control of information flowing within, and/or related to, the entire FMS. The FMS manages information flow based on rules.

Another aspect of the present invention presents a method of controlling and coordinating communication between diverse modules in an FMS. Communication can be coordinated between operational modules incorporated into the FMS; communication rules are verified during implementation and/or execution of software associated with said modules; and module operation can be continuously checked against the FMS architectural rules to ensure that module operation reflects the problem being solved and that module dependencies throughout the FMS mirror corresponding real-world dependencies as defined by FMS operating rules.

Another aspect of the present invention present an FMS for automating functions that flight crew routinely perform during flight and for providing higher-level functions normally impractical for crew performance manually. The FMS includes an architecture housing an electronic version of a flight plan and implementing complex flight operations; an interface for presenting a user view of the system architecture that can be simple and easy to understand as an interface between aircrew and aircraft; and an operator services module for allowing an operator using the interface to invoke services provided by the FMS, wherein, depending on the services invoked, the FMS can be required to obtain information from aircraft sensors and/or can assume control of aircraft avionics.

Another aspect of the present invention presents an FMS residing on a computing platform. The FMS includes an operator interface subsystem for collecting input from an operator and presenting output to the operator; a communications subsystem for managing and interpreting communications to and from aircraft and equipment used for communication; a flight management subsystem for managing functions associated with operation of an aircraft (e.g., flight planning and aircraft guidance); and a database management subsystem for managing and providing access to, databases and associated information.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 8 is a substantially complete subsystem diagram of an FMS architecture and associated subsystems and dependencies.

DETAILED DESCRIPTION OF PREFERRED EMBODIMENTS

A rigorous domain-based software architecture can be used to describe the improved Flight Management System (FMS) of the present invention. The FMS architecture reflects a current understanding that can be shared among virtually all FMS stakeholders and does not enhance or diminish the current set of capabilities provided by existing systems. One purpose of the architecture is to document the rules that must be followed during the implementation of software. The fact that the FMS Product Line system is rooted in a solid, domain-based software architecture, and that the software implementation can be continuously checked against the architecture will ensure that the software reflects the problem being solved and that the software dependencies mirror the corresponding real-world dependencies. In contrast, because there are generally no architectural guidelines for the implementers to follow, current systems are implemented in an ad-hoc fashion using whatever means are required to get the job done in the most expedient way. By mirroring real-world dependencies during construction of the FMS Product Line system, the spaghetti-code syndrome can be mostly averted.

The Flight Management System (FMS) described herein is a complex, integrated system that automates many of the functions that a flight crew routinely performs during flight. Because of its speed and ability, it can also be able to provide higher-level functions that previously were impractical for the crew to perform manually. Although the internal operation of such a system can be complex, from the crew's point of view it can be quite simple. To the crew, the system could easily be characterized as the single interface to most of the avionics systems in the aircraft and the system that houses the electronic version of the flight plan. Perhaps the biggest challenge for the FMS architects, especially with respect to human-factors, can be to continue implementing more and more complexity behind the scenes, while preserving the simplicity that can be perceived by the crew.

Tasks being performed by flight management systems are numerous and generally complex. The improved FMS architecture presented herein implements complexity while presenting a user view of the system architecture that can be simple and easy to understand.

The FMS architecture can be generally described herein in terms of functionally oriented subsystems as viewed from the perspective of an end-user. While it can be ultimately important that the implementation of the system match the conceptual view of the architecture, that does not imply that the implementation must follow a functional decomposition approach. It does require, however, that for the implementation approach that can be chosen, the concepts and rules imposed by the architecture, be faithfully adhered to in the resulting implementation.

Figure 1:
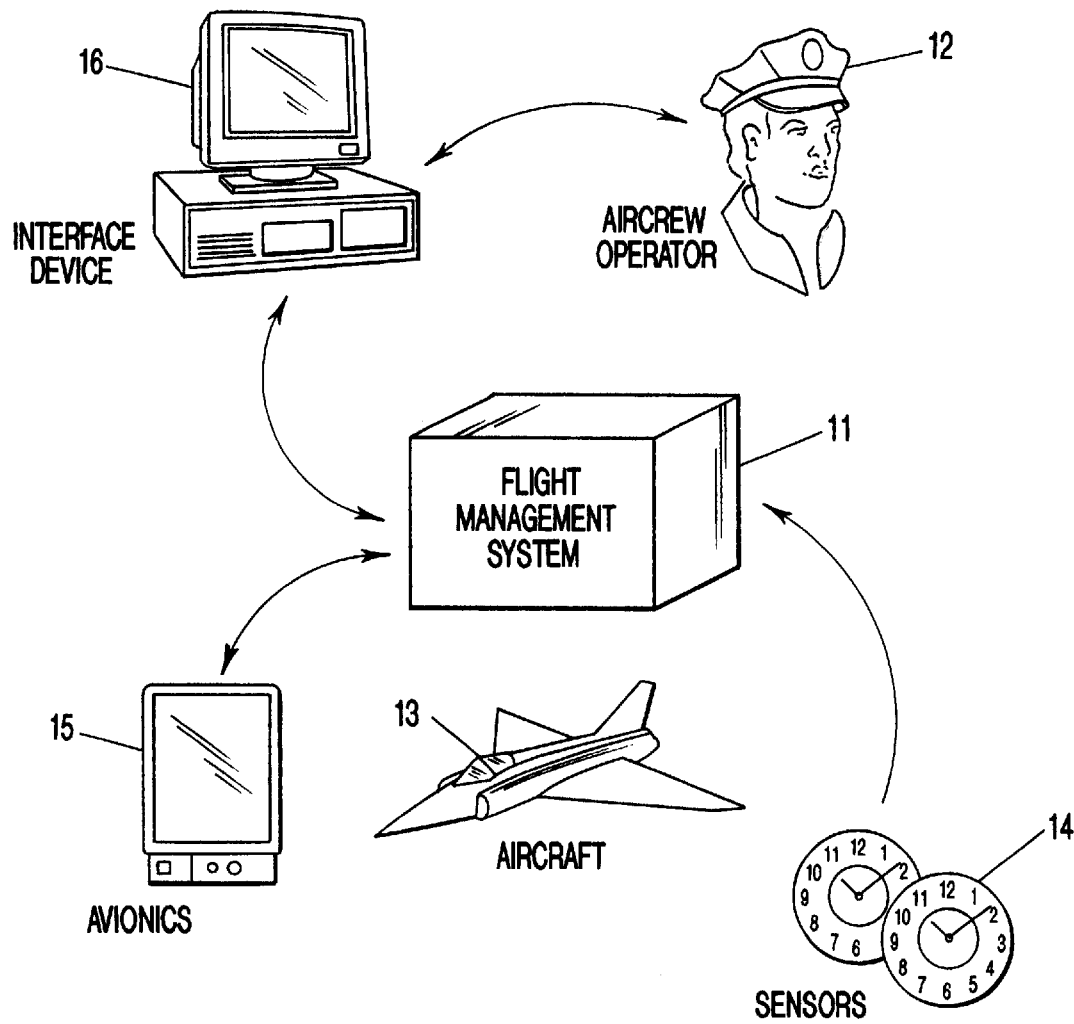
FIG. 1 is a basic illustration of an FMS and its surrounding environment.

The first step in designing the architecture of the FMS, as with any system, is to define the problem being solved and to examine the context in which the system is to operate. Referring to FIG. 1, a notional representation of the FMS 101 and its surrounding environment is illustrated. Although the context diagram presents a simplistic view of the entire system, it is not unrealistic to think of it in this manner. After all, the FMS 101 is, to a great extent, simply an interface between the aircrew 103 and the aircraft 103. Basically, using the interface provided by the FMS 101, the operator 103 invokes 106 the services provided by the FMS 101. Depending on the service that is invoked, the FMS can require information from aircraft sensors 104 and can control aircraft avionics 105.

Even though the FMS 101 can be pictured in the simplistic manner presented by the context diagram, there are actually several complex tasks being performed within the FMS 101. Therefore, to understand the details of how the FMS 101 performs its functions, it is beneficial to review the contents of the FMS box shown in FIG. 1. In describing the functionality of the FMS 101, its capabilities can be divided into just a few groups—called subsystems. Each of the subsystems are generally dependent upon each other to accomplish its function. Finally, the entire FMS 101 resides on a computing platform 201 to accomplish its function.

Figure 2:
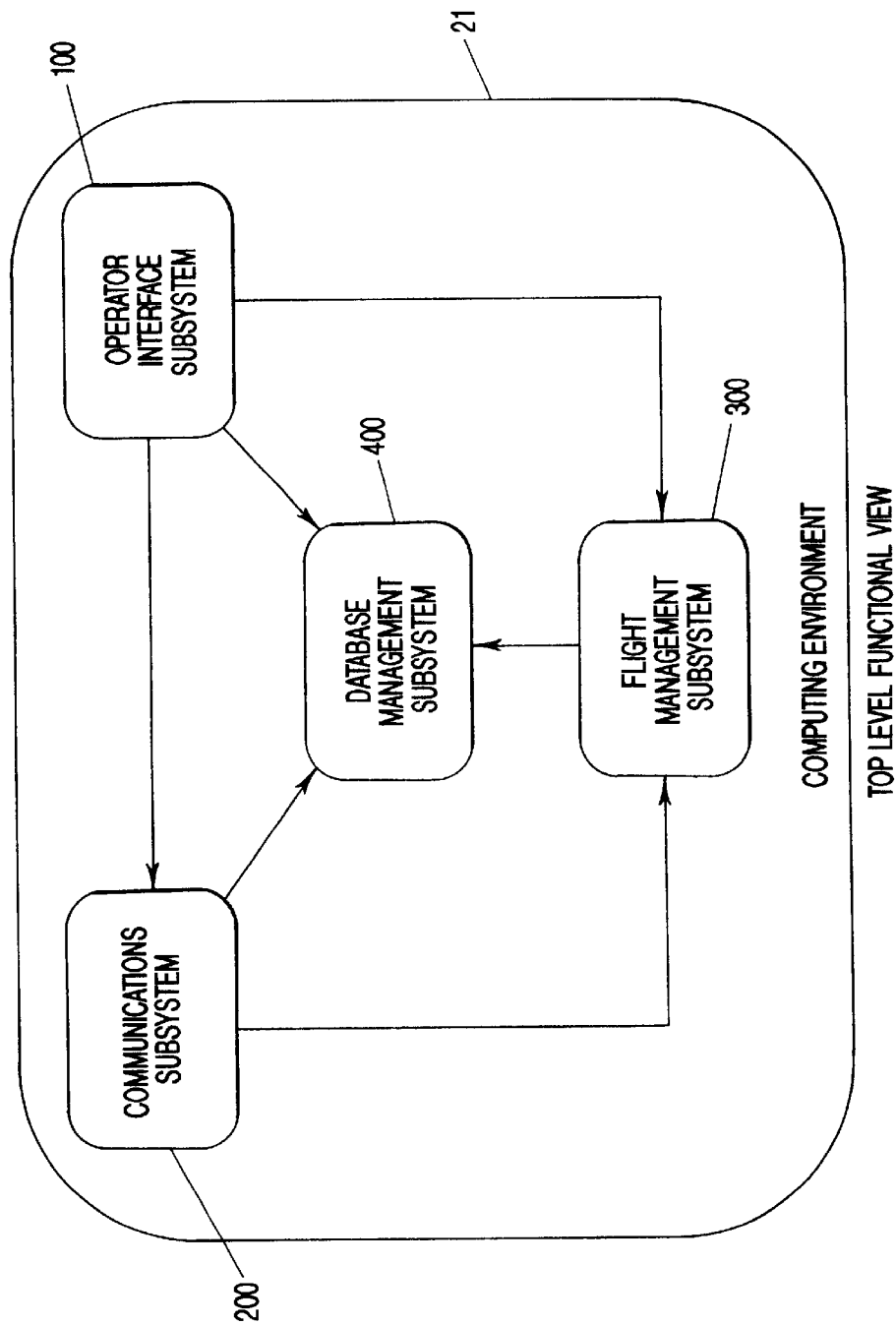
FIG. 2 is a block diagram of subsystems associated with the FMS and related dependencies.

A representation of this description of the FMS 101 is illustrated in FIG. 2. At this architectural level, the functions of the FMS 101 are classified in the broadest sense. Therefore, internally, there are four major subsystems that collaborate to accomplish the overall set of capabilities provided by the FMS 101.

The Operator Interface Subsystem 202 collects inputs from the operator 102 and presents outputs to the operator 102. This can be accomplished via several means 106 including without limitation a Control/Display Units (CDU), an Electronic Flight Instrumentation Systems (EFIS), annunciators, etc.

The Communications Subsystem 203 manages and interprets communications to and from the aircraft 103 and the equipment used for that communication, including both voice and data transmissions. Interpretation of data link information provided by a Communications Management Unit (CMU, not shown) can be performed in this subsystem.

The Flight Management Subsystem 204 manages all functions associated with flying of the aircraft 103 such as flight planning and aircraft guidance.

The Database Management Subsystem 205 manages and provides access to the several databases housed within the system, most notably the worldwide navigation database (not shown).

The diagram in FIG. 2 shows each of the subsystems as a box, their dependencies upon each other as arrows, and the computing platform 201 as the surrounding box. In FIG. 2, any dependency upon either the computing platform or the external environment (from the context diagram) is not shown. It should, however, be clear that those dependencies actually do exist, both physically and conceptually. Conceptually, each of the subsystems 202–205 have more of a dependency on the external environment than the computing platform 201. Physically, the subsystems 202–205 are dependent upon the computing platform 201 to access the external environment. This can be because the computing platform has a physical dependency upon aircraft wiring to affect the external systems.

Although the subsystems have dependencies upon the computing platform 201 and external environment, conceptually and physically, those dependencies cannot be seen in the diagram of FIG. 2. A more complete representation of the system is shown in FIG. 3.

Figure 3:
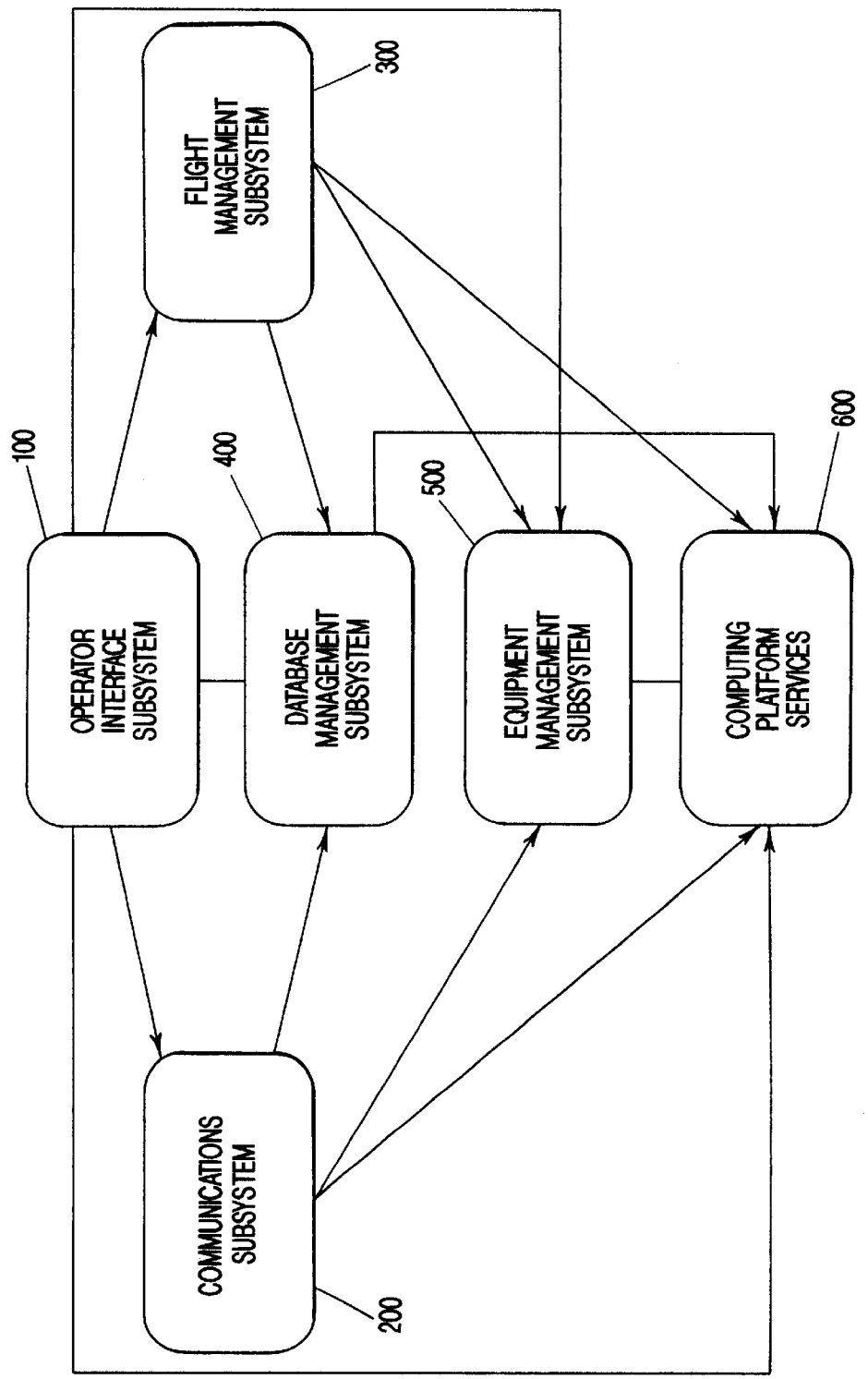
FIG. 3 illustrates additional dependencies including subsystems from FIG. 2.

FIG. 3 shows not only the dependencies visible in FIG. 2, but also the additional dependencies from each subsystem on the computing platform 201. Notice that an additional subsystem, Equipment Management Subsystem 302, has become visible. The purpose of this subsystem is to provide a domain-level interface to the equipment upon which the performance of application functions can be based. For instance, the Flight Management Subsystem 301 can depend upon inputs from an Inertial Navigation System (INS, not shown). While the logical, domain-level interface to the Inertial Navigation Subsystem can be important to Flight Management Subsystem 301, the low-level interface is not. Therefore, the Equipment Management Subsystem 302 is responsible for implementing the high-level interface using the low-level facilities provided by the computing platform 303. Therefore, the Equipment Management Subsystem has a dependency on the computing platform 303. The Communication Subsystem 305 is shown having dependencies on the Database Management Subsystem 306, Equipment Management Subsystem 302, and Computing Platform Services 303.

An important aspect of the system architecture is illustrated in FIG. 3. It should be noted that the dependencies between subsystems are illustrated in a "downward" direction; there are no dependencies of lower subsystems on those subsystems above them. The architecture can be totally predicated on the enforcement of what is known as the "subsystem-dependency rule." The subsystem-dependency rule states that" "A given subsystem may depend only upon another subsystem in the same or lower subsystems." Although the "same subsystem" portion of the rule is not illustrated in FIG. 3, its use will become apparent in subsequent views of the system. The implication of the rule is that higher-level subsystems can be dependent upon lower-level subsystems to accomplish their function, but not vice-versa. Enforcing this dependency rule causes the system to follow a client-server scheme where the clients are always above their available servers. This architectural feature makes it possible to ensure that the servers are designed such that the client is mostly irrelevant. It is important in preserving the integrity of the system architecture that the subsystem-dependency rule be enforced at all subsystems of the system.

The importance of enforcing the subsystem-dependency rule is well illustrated in the following example. Ideally, all of the application functions in the system are independent of the operator interface 304. Therefore, the operator interface 304 can be modeled as the ultimate client (i.e., at the top of the structure) while the rest of the application functions are lower in the hierarchy. By following the subsystem-dependency rule, no dependency can exist between the application subsystems and the operator interface subsystem 304. Therefore, the introduction of a new type of operator interface will have no effect on the underlying application, just as one would expect.

Figure 4:
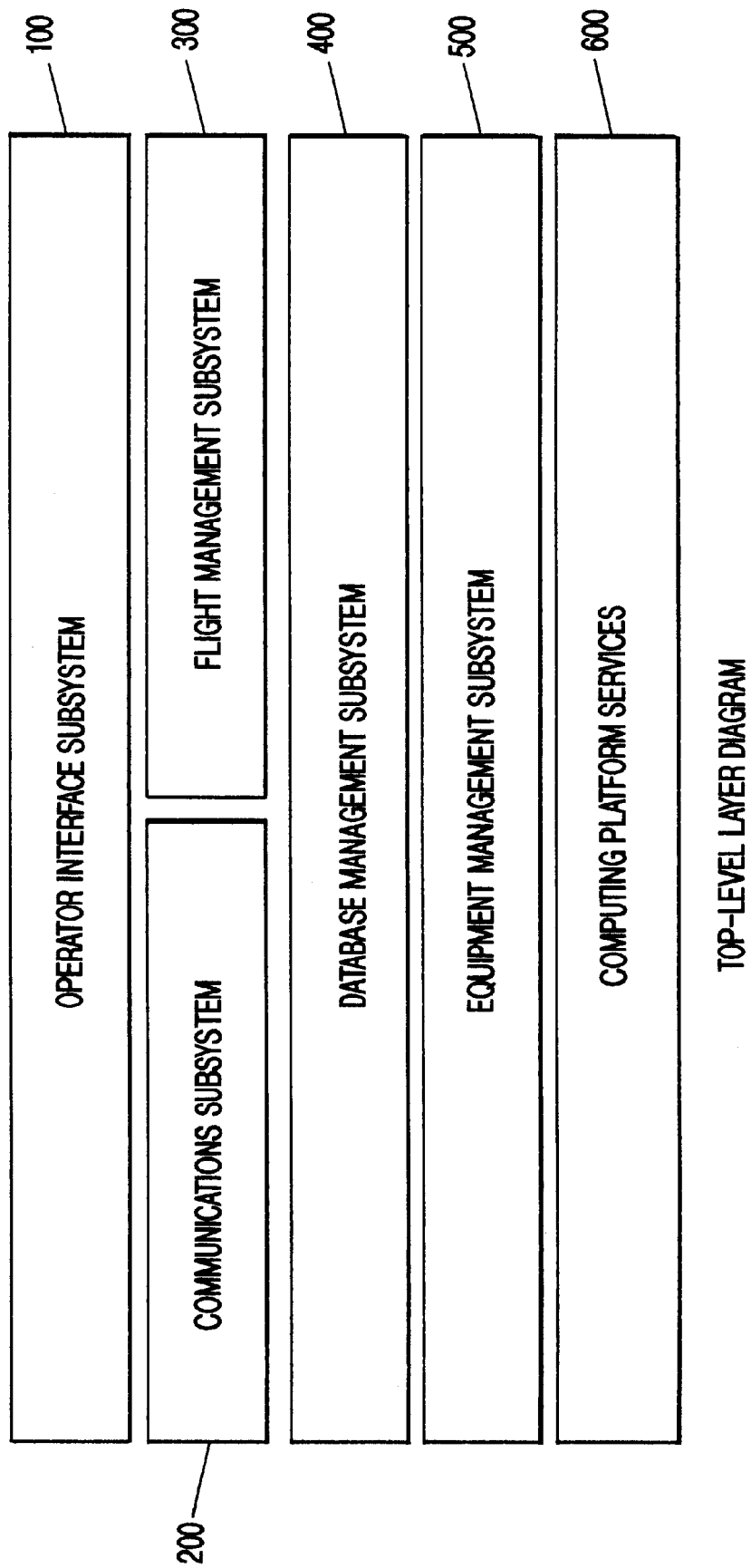
FIG. 4 is a subsystem representation of the subsystems represented in FIG. 3.

With a slight variation in diagramming, the architecture can be viewed in slightly different manner. In FIG. 4, the same subsystems depicted in FIG. 3 are represented, but their dependencies are not. This can be the only distinction between the two representations, except for the obvious graphical difference. The difference, however, can be quite important in laying the ground rules for system development. Indeed, the subsystem diagram of FIG. 4 shows all the potential dependencies that exist in the system. This view of the system has the benefit of providing implicit guidance for design decisions and future system upgrades because of the subsystem-dependency rule. By using the subsystem diagram in FIG. 4, one can verify that the dependencies in the diagram of FIG. 2 are valid. If a dependency turns out to be invalid, then there can be a basis for asking whether the system is being represented correctly, whether the functionality is well-understood or even whether the subsystem diagram truly represents the set of potential dependencies correctly. It can be important that the subsystem diagram be kept at a real-world domain level of understanding. By keeping it at that level, it should be quite clear what the set of valid potential dependencies actually is. Then, again because domain language is being used, when consulting domain experts regarding the validity of dependencies, the diagram can be interpreted and understood both by system architects and the domain experts.

While the top-level subsystem diagram of FIG. 1 illustrates potential dependencies between the major portions of the system, it is at too high of a level to adequately address the total set of capabilities generally provided by the FMS. As long as the subsystem-dependency rule is followed, however, it is valid to further decompose each of the major subsystems. The decomposition of each subsystem further refines the major portions within them and starts to clarify the potential dependencies that exist within the subsystem. Further decomposition can be performed as long as the resulting diagram conveys a reasonable level of understanding. Again, each of the subsubsystems should be defined using domain language. For illustration purposes, the Flight Management System has been further decomposed and the result is shown in FIG. 5.

Figure 5:
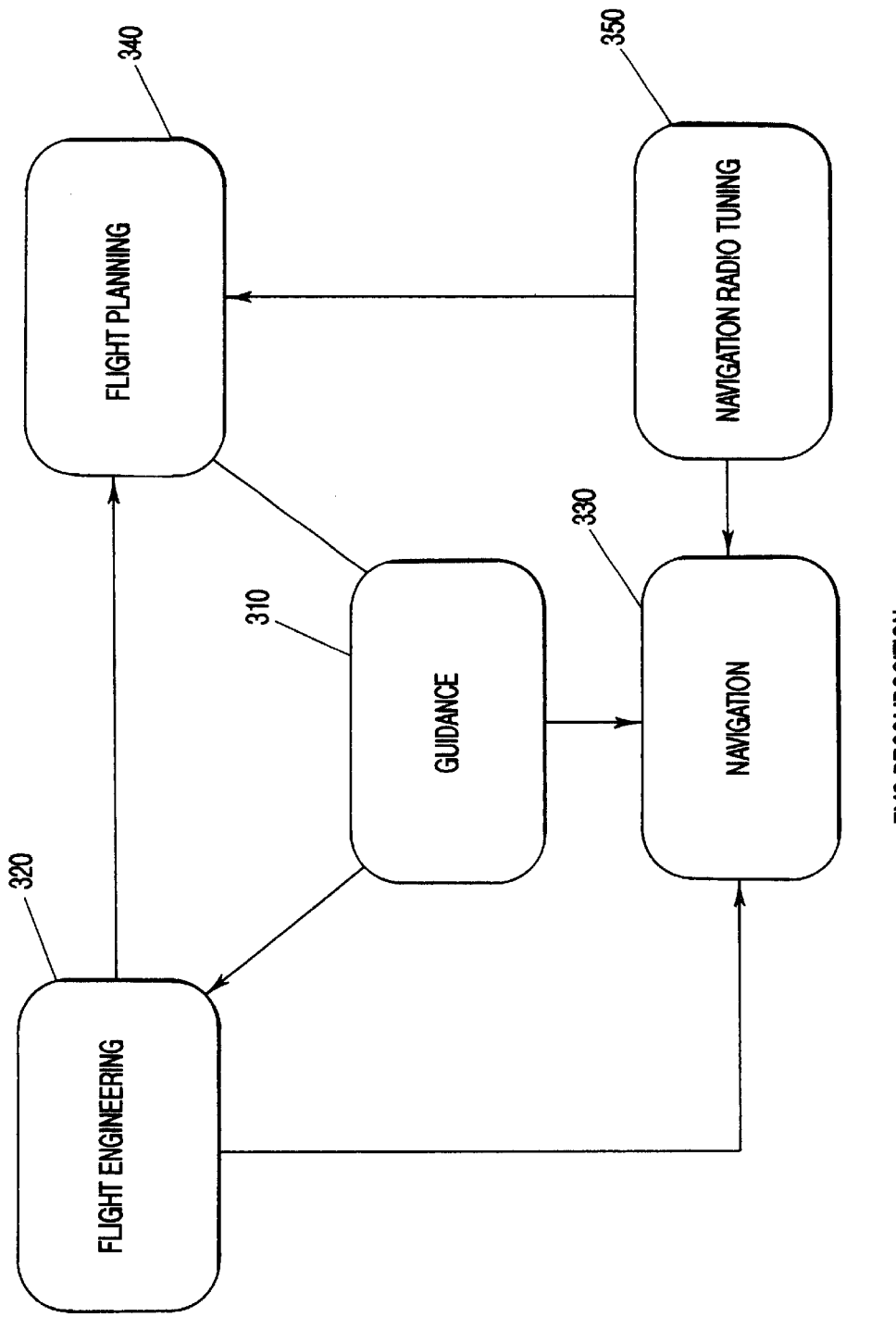
FIG. 5 is a block diagram illustrating through arrows the conceptual dependencies among five avionics functions.

In FIG. 5, conceptual dependencies among five real-world functions are shown. At this point in the decomposition, the focus is on determining how the capabilities of the system are broken down and what the relationships between those capabilities are. To determine the proper breakdown, it is useful to remember that the purpose of the FMS is simply to automate various functions that the flight crew had traditionally performed. Therefore, it is not unreasonable to expect the resulting FMS design to directly model functions that it is automating. Again, it is important to stay in the domain language as long as possible during system design so that domain expertise can easily be used to evaluate its correctness. In FIG. 5, Guidance 501 is shown to have dependencies on Flight Engineering 502, Navigation 503, and Flight Planning 504. Navigation Radio Tuning 505 on the other hand is dependent on Flight Planning 504 and Navigation 503.

Figure 6:
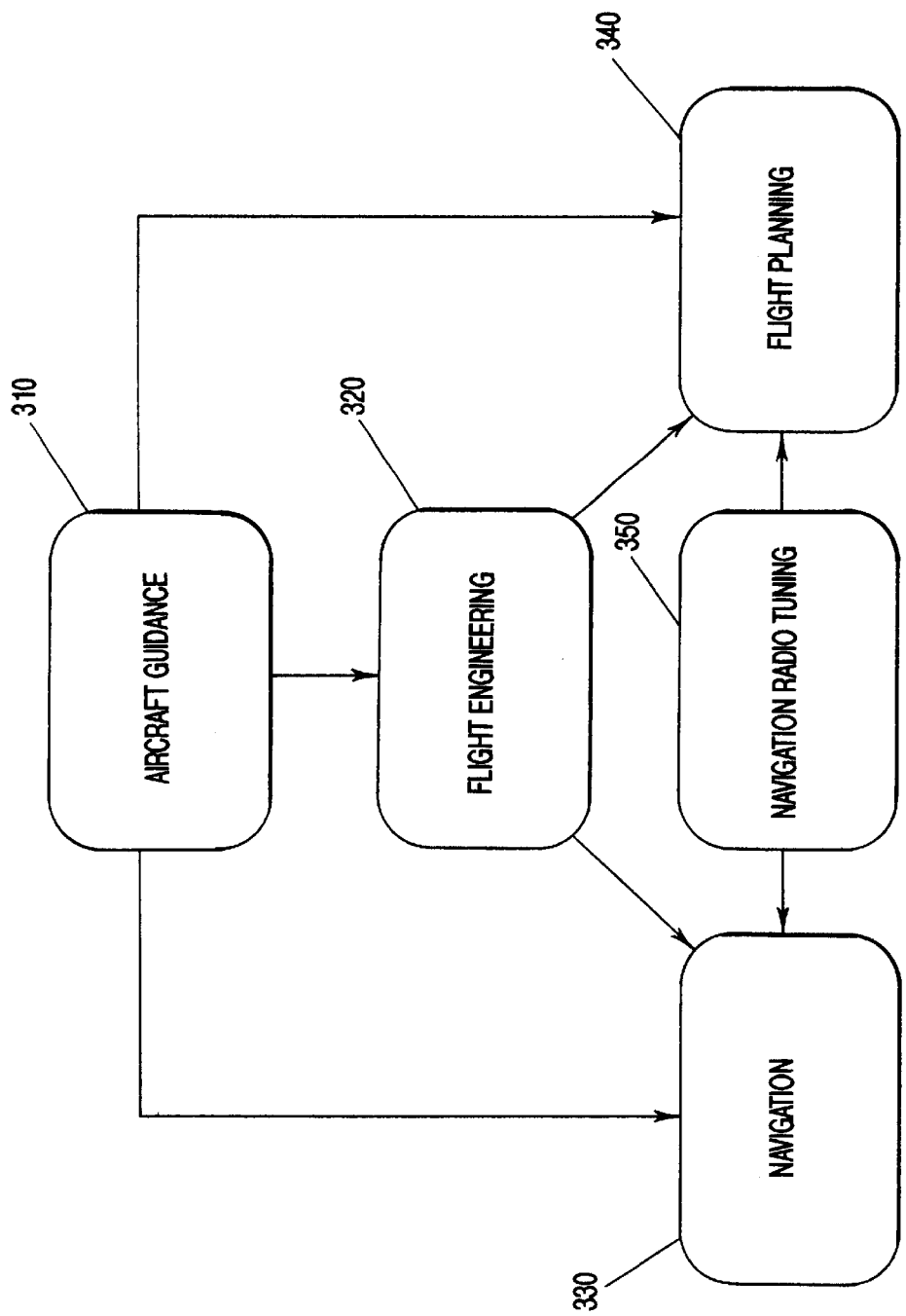
FIG. 6 is a block diagram illustration of subsystem dependency rules for the system of FIG. 5.

In the development of the decomposition shown in FIG. 5, no attention was paid to the structure of dependencies. Rather, it was modeled strictly from a "what-really-happens-in-the-real-world" perspective. If, however, the functions are simply rearranged on the diagram, it becomes clear that even the real-world representation of the system follows the subsystem dependency rules that have been set forth. This view of the system is illustrated in FIG. 6. Merely the fact that the subsystem-dependency rule falls out of the design provides some assurance that the model is correct.

Of course, just like the higher-level, the hierarchical diagram in FIG. 6 can be represented using the subsystem diagram. The subsystemed view of the FMS can then be integrated into the subsystem diagram for the overall system to get a more detailed view of the entire FMS.

Figure 7:
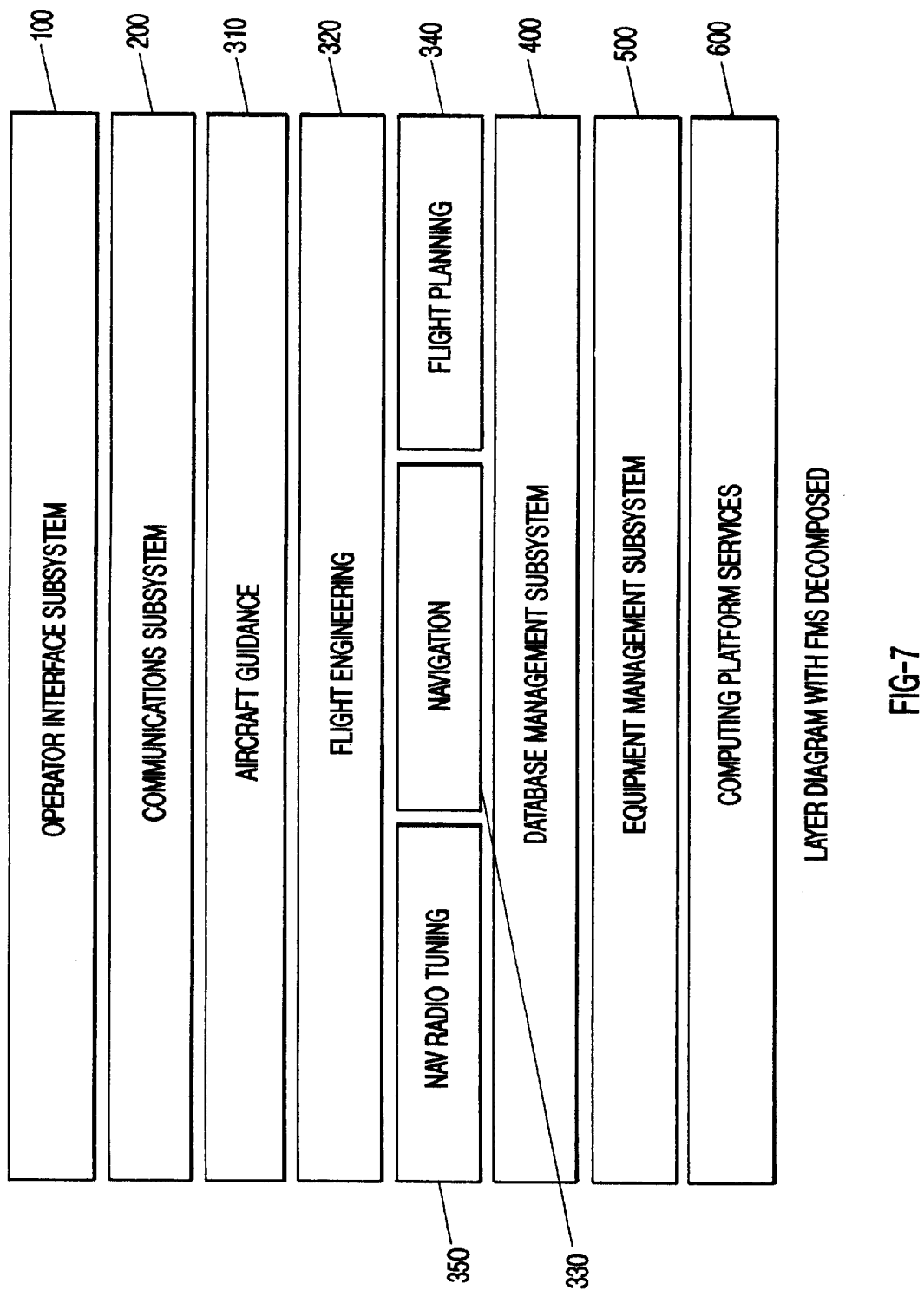
FIG. 7 is a subsystem diagram of a decomposed FMS.

Referring to FIG. 7, the subsystem diagram shows the effect of decomposition on an overall system architecture. Decompositions can be performed on the other major subsystems such that the complete subsystem diagram for the entire FMS can be derived. It is important to realize that the subsystems within the architecture are never etched in stone. As the system evolves, the change in subsystems can be inevitable. The architecture, however, must always reflect domain level language and potential dependencies that reflect the real-world view of the FMS. A subsystemed view of the entire FMS is shown in FIG. 8. Notice that the complete subsystemed architecture shows each of the other major subsystems in their decomposed states. In fact, upon further analysis of the FMS subsystems, it was discovered that there is yet another class of functions that must be performed by the FMS; Automated Crewmember Functions 801. The fact that this subsystem was added in subsequent review of the architecture illustrates that the structure of the overall system can remain fluid and still meet the architectural concepts. Over time, even the structure can solidify, but during initial system development it is likely that there can be additional modifications to that structure.

Each subsystem of one preferred embodiment of the FMS Product will now be described. Descriptions include the purpose of the subsystem (at a very high level), the relationship of the subsystem to the rest of the subsystems in the system, and the design concepts and architectural philosophies of the subsystems. Each subsystem can be described in broad terms with respect to the inputs, outputs, and processing that are a part of that subsystem.

The only responsibility of the Operator Interface System is to manage all operator interfaces to the FMS. This primarily includes Control Display Units (CDUs) and Electronic Flight Instrumentation Systems, but can include any other device or system that the crew can use to affect the operation of the FMS. While it may seem trivial, there are only two parts to operator interface management— collecting and interpreting inputs from the crew and gathering, formatting, and presenting system information for output to the crew. This can be especially important with regard to the architecture of the FMS because it is important that the operator interface not be aware of the details regarding operation of the applications. Instead, when the crew makes some input to the system that requests some operation be performed, the operator interface should only be aware of the existence of application support for that operation and the parameters that must be provided in order to accomplish it. Similarly for the output portion of the operator interface, the operator interface processing should be aware of the application services that provide data for presentation to the operator, but it should not be involved in any significant manipulation of that data.

The most complex of the operator interfaces subsystem to the system can be the CDU subsystem 802. The complexity of this interface arises not because of the CDU itself, but because of the entry methods employed by it. Whereas most of the cockpit interfaces are a series of switches or dials, which comprise a specific purpose interface to a device, the CDU has a keyboard and several buttons whose meaning can change depending on the context, thus a general-purpose interface. The generic nature of this interface drives the complexity because of the action verification and error handling aspects of the system that must then be implemented. With a specific interface, the number of inputs that must be handled is finite. With a general-purpose interface, however, there are virtually an infinite number of combinations of entries (inputs) than can be made and, therefore, that must be handled.

Although the general purpose nature of the CDU interface make its management difficult, its flexibility makes it a very attractive interface. The entire operation of the operator interface could change but the underlying applications in the system would remain completely static. Because of this, the interfaces to the underlying applications in the system should be well defined and the applications themselves must never directly reference the operator interface.

The CDU interface subsystem 802 can be based around pages. A page is a set of information that is displayed at the same time on the display surface of the CDU. Generally, the information on a page can be related in some manner such that there is a set of displayed parameters and a related set of options that define the operations that the keys on the bezel will perform. When an operation is invoked via a bezel button, that requires a typed-in entry, the contents of the scratchpad are used to communicate the data. These basic concepts of CDU operation should be provided as general-purpose services to all pages defined in the system, thus forming a framework for the management of pages.

Finally, there should be no other parts of the system that are concerned with the CDU as an input/output device. The CDU Management portion of the operator interface has the sole responsibility for interpreting CDU inputs and converting them into internal data representations and system commands. Conversely, CDU Management has the responsibility of making system requests and converting the resultant internal data representations into formats suitable for presentation on the CDU display.

The purpose of this portion of CDU Management is to collect operator inputs (bezel button presses, scratchpad inputs, etc.), validate those inputs as necessary based on the context in which they are entered, interpret the meaning of those inputs, convert those inputs into the appropriate application service requests, and then to provide those requests to the appropriate application(s).

It is generally important that CDU Management 802 only interpret the inputs to the point that they can be appropriately dispatched to the applications. Generally, this implies that CDU Management can be responsible for converting text based inputs into the appropriate internal representation (e.g. N35.12.45 into a record containing numerical representations for degrees, minutes, and seconds of latitude) and then passing those converted inputs to the application subsystem. In this case, the Operator Interface Subsystem knows that a latitude should be expected and it must also know the format of a valid latitude entry. Knowing this information, the Operator Interface Subsystem is able to determine the validity of the entry and is able to convert the entry from a human-readable form (a text string) into the internal FMS representation of latitude. This level of data manipulation can be acceptable, in fact required, of the Operator Interface Subsystem. It generally does not make sense for the application subsystem to do the conversion of text strings to internal forms of representation. Once the entry has been validated, the Operator Interface Subsystem determines the operation that is being requested and invokes the application services required to perform that operation. In a contrasting example, CDU Management subsystem 802 should not be responsible for converting the distance between two latitude/ longitude pairs and then sending the result to the application subsystem. Instead, the application should provide a service that takes two latitude/longitude pairs directly as input to perform the application service. No other processing in the system should be allowed access to the inputs provided by the CDU.

The Operator Interface Subsystem is responsible not for the generation of system data, but for the collection of system data from the applications and the subsequent formatting and presentation of that data such that it can be understood by the crew. For instance, CDU Management (or any other part of the operator interface) should not be processing aircraft headings and velocities to determine wind speed and direction. Instead, the application should determine wind parameters in whatever way it deems best, and the operator interface should simply use the services provided by the application subsystem to retrieve wind parameters. Once retrieved, the operator interface can be responsible for converting internal representations to text strings, for instance, for subsequent presentation on the CDU display.

There can be occasions where it is certainly appropriate for the operator interface to perform more complex processing. For instance, the application subsystem can keep all headings in relation to true north. The operator interface, however, can provide the option of displaying headings referenced either to true north or to magnetic north. In this case, it can be entirely appropriate for the true/magnetic conversion to be performed by the operator interface (in addition to keeping track of the current mag/true selection). The key to success, however, can be to absolutely determine that such processing is truly for display purposes only. In practice, there are very few instances where raw data must be manipulated solely for the purpose of generating displays.

Electronic Flight Instrumentation Systems (EFIS) processing collects various data from the FMS that is destined for display on the EFIS. The data is then converted from internal representations into the formats required by the EFIS and then sent to the EFIS. The EFIS can have several modes into which it can be commanded. Often, the FMS Product system will be the entity that commands the EFIS into the appropriate mode, but there are several ways for the crew to communicate the desired EFIS mode to the system. For instance, there can be control panel switches that are read by the FMS or there can be a CDU page on which the EFIS mode can be selected. Regardless of the method employed, the EFIS subsystem must provide a service that can be used to set the EFIS mode. This service can then be used as required by other subsystems (or, possibly, the same subsystem) to effect a change on the EFIS displays. The point is that the EFIS subsystem not be dependent upon another subsystem simply to determine the EFIS mode. Rather, that can be something that should be communicated by some other subsystem to the EFIS subsystem. The output processing of the EFIS Management subsystem can be straightforward. Basically, services from lower application subsystems are used to collect data. Then, that data can be reformatted as required for communication with the EFIS. Finally, the services of the Equipment Management subsystem are used to transmit the data to the EFIS.

With respect to the overall function of the FMS, the Data Link Management System (DLMS) can be nothing more than a remote user of the system. The user inputs and outputs are simply communicated via radio transmissions instead of via direct connection of a device in the cockpit. This detail, however, does not preclude viewing of the DLMS in the same light as CDU Management or EFIS Management. In fact, just as the CDU Management subsystem 802 can be the only subsystem that can be aware of the presence of a CDU, the Data Link Management subsystem 803 can be the only subsystem 803 that is aware of the presence of the data link. Once the Data Link Management subsystem 803 has interpreted the messages from the data link and converted them to application service requests, the rest of the system has no idea of the source of those requests. They could just as easily be coming from the CDU Management subsystem 802. The isolation of the data link servicing can be a crucial point in the design and architecture of the FMS Product Line.

Although no other entity in the system needs to be aware of the data link per se, subsystems that reside above the Data Link Management subsystem clearly know of its existence and can use that knowledge as required. Generally, flight crews do not appreciate automatic changes such as modification of the flight plan. Since the flight crew has ultimate responsibility for the safe operation of the aircraft, they should have the final say regarding any commands that can affect their trajectory. Therefore, when an uplink is received, the crew should manually accept the proposed change. Since this can be accomplished via the CDU, the CDU Management processing must access the Data Link Management subsystem 803 to collect the pertinent information. It can be important to remember, though, that only those details of the data link subsystem that can be important to higher subsystems should be exported. For instance, it can be appropriate to export services indicating whether there can be an uplink pending and what type of data can be being uplinked. It may not be appropriate, however, to export services for interpreting raw message data or to communicate with the data link computer.

Continuing with the view of the data link as a remote user, in real world terms, the user on the other end of the data link is probably a human. In the CDU Management subsystem 802, data can be converted to and from a form that can be understood by the user; text strings. Although the remote user on the other end of the data link is probably a human, in the context of the FMS, it can be a machine. Nevertheless, the Data Link Management subsystem 803 acts similarly to the CDU Management subsystem 802 with respect to the user. The data link subsystem 803 also converts data to and from a form that can be understood by the user, but the user in this case can be a machine.

The bottom line with respect to the architectural view of the Data Link Management System 803 is that it should be viewed exactly as either of the two subsystems in the operator interface layer. All the details regarding the physical interface should be processed internally to the subsystem. Operations requested over the data link should be converted internally to the set of application service requests that are required to perform that operation. Therefore, given the same operation commanded via the data link as would be commanded via the CDU 802, the exact same application service requests would be invoked.

The input processing required for this subsystem 803 comprises collecting transmission requests (uplink and downlink) from the data link equipment and also collecting of uplink data from the data link equipment. The collected data is then used to invoke application services to accomplish the appropriate request. Additionally, this subsystem receives inputs from higher subsystems in the system such as operator mode settings or requests that are commanded from the CDU Management subsystem 802.

The outputs of this subsystem 803 comprise primarily messages to the data link equipment. Data to be downlinked can be first collected from the application subsystems, then formatted and sent to the data link equipment in the Equipment Management subsystem 302.

The Flight Management System (FMS) is generally responsible for performing all those capabilities of the system that deal with the actual flight of the aircraft. These capabilities are generally functions that used to be performed by a crewmember but that are now automated by the FMS or functions that assist a crewmember in performance of his/her task. The typical, basic functions that are performed by the FMS are, not surprisingly, almost one to one with the crewmembers on a typical aircraft.

Navigation 503: the navigator determines current position and state of the aircraft Guidance 501: the pilot determines control inputs to guide the aircraft along its desired path Flight Engineering 502: the flight engineer monitors aircraft performance and predicts aircraft situation along the flight path The existence of the Automated-Crewmember functions subsystem can be necessitated by the fact that the FMS has some capabilities that relate two sets of data that are otherwise unrelated. These types of functions are best illustrated using a non-limiting example.

The FMS provides the operator with the capability to manage a set of custom waypoints that are physically contained in the Database Management subsystem 306. The operator can define a custom waypoint via the entry of a waypoint name and the position of the waypoint. The operator can also modify or delete any of the custom waypoints. Once defined, a custom waypoint can be used just as any other entity that defines a position, including as one of the endpoints of a flight plan leg.

Assume that a flight plan has been entered and on e of the legs is defined using a custom waypoint. Then, the operator decides to delete the custom waypoint from the database. System requirements, however, do not allow the deletion of a custom waypoint if it is part of a flight plan. If this requirement is implemented simply by having the custom waypoint processing, in the database management subsystem 306, check the flight plan, the subsystem-dependency rule will be broken. Further analysis of this requirement, however, will reveal that this can be a higher-level system requirement. The system could surely be defined to allow that operation to occur. Certainly the custom waypoint processing does not have any problem deleting a custom waypoint at any time. Therefore, the proper way to implement this requirement can be to place a custom waypoint delete operation in a subsystem 801 that is above both Database Management 306 and Flight Planning 504.

This is a pretty specific example in the scheme of the entire system. There are, however, other capabilities that fall into this general category. In fact, the auto-tuning function for the navigation radios could be classified as an automated-crewmember function. That function uses the services of Navigation 503, Flight Planning 504, and Database Management 306 to accomplish a more complex, higher-level function. That particular subsystem 505 is broken out only because of its significance as a feature of the overall system and because of its complexity.

The inputs to this subsystem are really varied. The most important aspect to the inputs for this subsystem 801 is that the inputs come from two or more lower subsystems. If a particular capability of this subsystem requires inputs from only one lower subsystem, then the capability should probably be implemented in that lower subsystem.

As with the inputs, the outputs of this subsystem are widely varied and simply depend on the higher level function that is being implemented.

In the available legacy systems, this subsystem is virtually non-existent. In fact, the absence of this subsystem can be one of the primary causes of the implementation complexity found in those systems. In fact, in the custom waypoint example given above, the existing systems implemented the requirement by simply making the database management function dependent upon the flight planning function. Multiply that artificial dependency by the number of those types of higher-level functions and the complexity becomes virtually incomprehensible.

The approach to the development of this subsystem 801 is to identify those functions that belong to the class of higher-level functions within the existing systems. Once identified, it can be simply a matter of moving the function from where it is currently implemented into the automated-crewmember functions subsystem 801. By moving the function, the artificial dependencies from the original subsystem are eliminated.

The purpose of the Navigation Radio Tuning (NT) system can be generally two-fold. First, the system generally provides a set of services that can be used to tune the on-board navigation radio receivers to a navigation (navaid) aid. Second, the system generally provides a function that can be used to select the best navaids to which the receivers should be tuned. By using these two facets of NT together, the Navigation subsystem can be able to compute the best possible aircraft position. By accomplishing this function in an automated fashion, the system can be able to relieve the flight crew of both navaid determination and radio tuning tasks.

The set of radio tuning services provided by NT are designed for use by any entity that has a requirement to tune the navigation radios. It is reasonable to ask: "Why cannot I just tune the radio directly and not have to go through this set of services?" The answer is that, for a navigation radio to be useful, it must be tuned to a navaid whose position on the earth is known. If a navigation radio is simply tuned to a frequency, the resulting information is useless. Therefore, the set of services provided by NT exist solely to determine the navaid (more specifically, the position of the navaid) associated with the desired tuning operation. Of course, a radio could be tuned using a navaid identifier, in which case, the operation can be easy. When tuning via just a frequency, however, the services will search the set of navaids in the vicinity of the current aircraft position for a navaid that has the given frequency. If no compatible navaid is in the vicinity, the radio is still tuned, but the resulting navigation information received from the radio, if any, will not be generally useful in determining a radio position.

The second portion of NT is the automatic selection of navaids to which the radios should be tuned. Normally, the flight crew is responsible for monitoring progress of the flight and tuning the navigation radios to different navaids along the route. This portion of NT does simply that, with some specific criteria for selection that will result in the best position computation given the available navaids. The final determination of the best navaids can then be used to tune the radios, using the radio tuning services described above. This overall process is termed Auto-tuning and is designed to execute without crew intervention.

When the radios are being tuned manually (an input that is provided by upper subsystems), the subsystem processes the manually entered tuning requests and attempts to correlate the request to a navaid that is close to the current aircraft position. The navaid information is gathered from the Database Management subsystem 306. When auto-tuning is active (an input that is provided by upper subsystems), the Navigation Tuning subsystem 505 periodically searches for a better set of navaids to which the navigation radios should be tuned. Inputs required for the auto-tuning capability include a list of navaids from the navigation database 508 and the current aircraft position from the navigation subsystem 503. The accuracy of the position is irrelevant to NT, although, the receipt of an inaccurate position can result in the system tuning to navaids other than those that will result in the optimal position calculation.

Regardless of the tuning mode (auto or manual), the output of this subsystem is simply radio tuning commands. These commands go directly to the receivers, which are modeled in the equipment management subsystem. It is important to the design of the system that no other subsystem tune the receivers in the equipment management subsystem directly.

Both existing military and commercial systems have Navigation Tuning functions. Commercial systems typically have VHS (Very High Frequency) Omni-directional Ranging (VOR) receivers and a scanning DME. Military systems typically have (VOR) receivers and Tactical Air Navigation (TACAN) transceivers.

The vertical guidance subsystem 804 is another of the high-level functions of the FMS. Its purpose is to provide commands that will cause the aircraft to maintain the intended vertical flight path. The commands could be in many forms such as climb/descend cues or control surface deflections. Regardless of the output form, the details of vertical guidance should remain invisible to users of the subsystem.

One design goal for Vertical Guidance can be that it should be removable with little to no functional impact to the rest of the system. It is realized that there can be impacts to Flight Engineering, so it can be acceptable to be able to remove Flight Engineering and Vertical Guidance as a pair. This is a goal because some customers either do not want to or have no way to use the products of vertical guidance. Therefore, the system should easily accommodate that type of customization.

Vertical Guidance should be designed such that it can be able to compute steering commands based simply on the altitude-related information for each leg in the flight plan. It should have no knowledge of complex structures or patterns that can be used during the construction of the flight plan.

The vertical guidance function simply gathers the intended vertical trajectory of the aircraft from the flight planning subsystem 504 and the current aircraft state from the navigation subsystem 503. The flight engineering subsystem 502 will provide some data that act as constraints on the operation of vertical guidance. The vertical guidance function can be responsible for gathering those inputs from the flight engineering subsystem 502.

The primary output of the vertical guidance subsystem 804 is a set of commands that will cause the aircraft to follow the intended vertical trajectory. The commands can be in the form of speed and altitude targets or in the form of pitch commands. While the choice is generally dependent upon the data required by an autopilot, the vertical guidance function should be capable of producing either form. In fact, the vertical guidance subsystem should provide either form as an option. The vertical guidance function will also output data that is capable of driving an autothrottle in case one is installed on the host aircraft.

The lateral guidance subsystem 506 is another of the high-level functions of the FMS. Its purpose is to provide commands that will cause the aircraft to maintain the intended lateral flight path. The commands could be in many forms such as turn left/right cues or control surface deflections. Regardless of the output form, the details of lateral guidance should remain invisible to users of the subsystem.

Lateral Guidance subsystem 506 should be designed such that it simply requires the flight plan legs with no regard to their source. For instance, Lateral Guidance should treat legs that were manually strung together exactly the same as those that are part of a SID, STAR, Holding Pattern, or any other complex structure. In fact, Lateral Guidance really only requires the parameters of the current leg and the next two legs in the flight plan. No other information regarding the flight plan can be required. Other than that, Lateral Guidance gets navigation data directly from the navigation subsystem 503 and performs its function of providing guidance commands to follow the intended lateral flight path.

The lateral guidance subsystem 506 function gathers the intended lateral trajectory of the aircraft from the flight planning subsystem 504 and the current aircraft state from the navigation subsystem 503. The flight engineering subsystem 502 can provide some data that acts as constraints on the operation of lateral guidance. The lateral guidance subsystem 506 function is responsible for gathering those inputs from the flight engineering subsystem 502. The primary output of the lateral guidance subsystem 506 is generally a set of commands that will cause the aircraft to follow the intended lateral trajectory. The commands are generally output in the form of roll commands.

The flight engineering subsystem 502 performs many of the functions that the crewmember known as the flight engineer typically performed. Those functions fall into several categories including the determination of weight and balance parameters, the computation of V-speeds based on current conditions, computation of current fuel consumption during the flight, and prediction of various flight information at each point along the flight plan (estimated time of arrival, fuel remaining, etc.). The flight engineering function 502 is one of the higher-level portions of the Flight Management System subsystems. Therefore, within the application subsystem, it resides in the uppermost subsystems and utilizes services from lower subsystems to perform its duties. Because of this, there are no dependencies upon flight engineering from elsewhere in the FMS.

Most of the flight engineering subsystem 502 functions remain the same regardless of the aircraft for which they are being performed. The data, which can be used in the performance of flight engineering functions, however, changes based on the characteristics of the aircraft. For instance, the distance required for takeoff will vary among aircraft, but the procedure used to calculate that distance will remain constant. Therefore, the portion of the flight engineering function responsible for computing those types of parameters must be designed in such a manner that aircraft specific data can simply be loaded and none of the operational software involved in the computational procedures requires modification.

Because of the variety of tasks that flight engineering performs, the inputs to this subsystem are widely varied. Many of the functions require parameters that are typically provided by an operator. Typical inputs include values such as gross weight, zero fuel weight, and outside air temperature. These types of input values are used to perform operations such as calculation of Take Off and Landing Data (TOLD) parameters. More complex functions that are performed by flight engineering such as calculation of ETAs (estimated time of arrival), remaining fuel at each point in the flight plan, and top of climb point calculations require knowledge of the flight plan and the current state of the aircraft. The flight engineering function gathers these inputs from lower subsystems of the application as required. Of course, the performance database 507 is an input generally required by the flight engineering subsystem. The data from the performance database 507 can be gathered by the flight engineering subsystem 502 by accessing services provided by the database management subsystem 306.

The outputs provided by the flight engineering subsystem 502 fall into two categories. The first category includes of calculation results that are simply made available to higher subsystems. The results of TOLD calculations fall into this category.

The other category includes again of calculation results, but these results are inserted into the flight plan. For instance, the calculation of ETA at every remaining waypoint in the flight plan can be performed by flight engineering 502, but the results are inserted into the flight plan using the services of the flight planning subsystem 504.

Navigation can be described simply using the phrase "Where am I?" This is in contrast to guidance functions, which can be described by "Where do I want to go?" This simple phrase gives the entire purpose of the Navigation subsystem 503. Using available navigation sensors, a Navigation subsystem determines the state of the aircraft and makes it available to all other applications (in accordance with the subsystem-dependency rule) within the FMS.

The state of the aircraft can be characterized using a fairly small set of parameters: position, altitude, heading, course, airspeed, ground speed, winds, vertical speed, attitudes, attitude rates, magnetic variation.

For each of the data quantities within the Navigation subsystem 503, there can be several possible units of measure. For instance, position could be provided in degrees/minutes/seconds or in radians and heading could be provided with respect to either true or magnetic north. The design philosophy in regard to units of measure can be that the Navigation subsystem 503 will provide data in a single, consistent unit of measure and then will provide general-purpose services to convert to/from other popular units of measure.

A Navigation subsystem can be capable of generating the aircraft state using several different navigation solutions; the actual solutions provided for an aircraft depend upon the suite of navigation sensors installed on that aircraft. The sensor suite can include navigation radios, Inertial Navigation subsystems (INS), Global Positioning System (GPS), possibly even others. Regardless of the sensor(s) used to determine the aircraft state, the Navigation subsystem must provide the basic outputs enumerated above. The Navigation subsystem can use complementary sensors to supplement a sensor that does not provide the entire set of parameters. Also, the Navigation subsystem can use blending or filtering algorithms to refine or augment the raw sensor outputs. Regardless of the methods used, the Navigation subsystem 503 should be structured such that no other system has visibility into the computational methods used to determine the aircraft state.

The purpose of this portion of the Navigation subsystem 503 is to determine which sensor(s) to use in generating the aircraft state. In general, any navigation sensors, which are selected by the crew, can be used to generate the aircraft state. The crew has the ability to deselect sensors through the operator interface 304. The Navigation subsystem 503 determines the sensor or combination of sensors that will provide the most accurate aircraft state.

During normal operation, the Navigation subsystem 503 generates the aircraft state based on a sensor set that is either manually or automatically selected. The aircraft state can be populated by either acquiring data directly from sensors such as a GPS receiver, or by computing the data as is done to compute a position using range and bearing information from a TACAN.

Minimally, the navigation subsystem will provide aircraft state using the following sources of navigation data: GPS, INS, Radio (using either one or two navaids) complemented by INS, A solution derived by blending information from two or more sensors.

During simulation operation, the Navigation subsystem 503 generates the aircraft state parameters based upon simulation commands. Once the Navigation subsystem 503 has populated the aircraft state, it serves as the navigation interface to the other FMS functions residing at or above this subsystem.

Functions in the Flight Planning Subsystem 504 are responsible for building and maintaining the list of legs comprising the flight plan. The flight plan can be composed of three basic parts—the origin, the destination, and one or more legs in between. A flight plan leg is defined as the path between two waypoints. Legs can be entered into the flight plan simply by specifying waypoints. In addition, complex, predefined sequences of legs can be entered into the flight plan using a single entry or a set of definition criteria. Examples of such leg sequences are Standard Instrument Departures (SIDs), Standard Terminal Arrivals (STARs), and holding patterns. The rules for building the flight plan and the types of legs supported by the flight plan are specified in ARINC standards. Specialized military flight patterns not addressed by ARINC standards are standardized within the FMS Product Line; these patterns include those used for aerial refueling and air drops.

Since the flight plan can be the key data structure in the Flight Management Subsystem 204 in the architecture, the interface to Flight Planning can be critical to the other systems residing in the subsystems above it. Flight plan data can be accessed only through the services provided by this system. Other systems within the FMS Product Line requiring access to the flight plan must use only those services provided by Flight Planning. In order to avoid possible contention amongst Flight Planning 504 clients, requests for flight plan modifications is prioritized and queued.

The purpose of this portion of Flight Planning 504 is to process incoming requests to either add/delete legs or modify the data associated with existing legs. Although these requests can come from a variety of sources, including external sources such as the crew and datalink operators, and internal sources such as other systems within the FMS, the requests themselves are dispatched in a standard and consistent manner by Flight Planning 504 regardless of the source. The dispatching of any particular request remains the same whether it was instigated by the crew or by the Flight Engineering subsystem.

Flight Planning 504 provides an interface such that clients can retrieve all necessary information from the flight plan. All other systems within the FMS must use this interface in order to obtain flight plan data. When certain components of leg data are modified this causes the flight plan to indicate to all clients that it has been modified such that the changes must either be accepted or deleted.

Historically, the Flight Planning subsystem 504 and the Guidance subsystem 501 have been tightly coupled making flight plan related changes unnecessarily complex and time-consuming. In the present subsystem architecture, Guidance 501 depends upon Flight Planning 504, and Flight Planning 504 has absolutely no knowledge of Guidance 501 as it resides in a higher subsystem. The purpose of Guidance 501 is purely to guide the aircraft by producing steering commands and targets, while the purpose of Flight Planning 504 is purely to maintain the list of flight plan legs. This disciplined separation of concerns should make future enhancements to Flight Planning much simpler and less time-consuming. Indeed, if this separation of concerns is strictly adhered to, future changes to either Flight Planning or Guidance should be very minimal.

Expected flight plan related enhancements are additional specialized flight patterns such as the previously mentioned aerial refueling and air drop patterns. In the case of many of these specialized patterns, it would be most expedient to install the new functionality in the Auto-Crew Member architectural subsystem, which has knowledge of the entire FMS. Adding new functionality at this subsystem does not impact the existing core FMS, minimizing the effects of adding new functionality in terms of side effects and regression testing.

The database management subsystem 306 is primarily responsible for management of the world-wide navigation database. Generally, when one references the database, the reference is actually being made to the navigation database. There are, however, several other databases that are important to the overall functioning of the FMS. These databases include the communications database and the performance database. The communications database primarily contains frequency lists used during communications radio tuning and the performance database contains information regarding the characteristics of the airframe and engines.

The navigation database management subsystem 508 is responsible for retrieving data from the navigation database as requested. Regardless of the actual database used, there is a given set of data that is required from this database. The navigation database management subsystem must be capable of retrieving a single entity from the database or a list of related entries from the database. For instance, a request for the information associated with a navaid can be for a single navaid or for a list of the navaids within 50 nautical miles of a given position. In other examples, the entity requested can normally be in the form of a list; as in the case of an airway that contains several waypoints. The key to successful development of the navigation database subsystem can be the construction of a relatively standard interface that is targeted toward the domain requirements. The implementation, then, of that interface can easily vary with the database source data and no other parts of the system would be affected. The database will minimally contain services to retrieve the following (either singly or in a list, if applicable): Navaids, SIDs, STARs, Waypoints, Airways, Airports, Runways, MTRs, and Refueling routes.

The input processing required of the navigation database subsystem 508 is, simply, the interpretation of database requests and the retrieval of the corresponding data from the internal data structures. The output processing in the navigation database subsystem is, simply, to provide the data that was requested.

The performance database management subsystem 507 is responsible for retrieving data from the performance database as requested. The performance database can be characterized by a general set of data that is required by the flight engineering algorithms. The format and structure of the actual performance data will be hidden by the standard interface that is available to application subsystems. As with the navigation database subsystem 508, the key to successful development of the performance database subsystem 507 can be the construction of a standard interface that is targeted toward the domain requirements. The implementation, then, of that interface can easily vary with the database source data and no other parts of the system would be affected. The database will contain services to retrieve the following types of data: Airframe characteristics, Drag, Speeds (values and limits), Altitude limits, Lift coefficients, Engine characteristics, Thrust to power settings, Fuel Flow to power settings.

The input processing required of the performance database subsystem is the interpretation of database requests and the retrieval of the corresponding data from the internal data structures. The output processing in the performance database subsystem 507 is, generally, to provide the data that was requested.

The communication database management subsystem 509 is responsible for retrieving data from the communication database as requested. The communication database primarily contains lists of frequencies to be used during the tuning of communication radios. This database is somewhat different than either the performance or the navigation databases, in that application subsystems have the ability to both read and write to the communication database.

The input processing required of this subsystem includes retrieving data for the application subsystems and also storing data from the application subsystems into the database structures. The output processing in this subsystem includes of the return of data that was requested by higher application subsystems.

The Platform Services layer 300 contains subsystems that are dependent upon the computing platform in some way. The subsystems within Platform Services exist entirely to isolate the true applications of the FMS Product Line from the underlying computing platform. Therefore, the subsystems contained in platform services must be implemented such that the interface to those subsystems can remain constant while the implementation of those subsystems (which is where the actual dependence on the computing platform exists) performs the functions required to implement that interface on the computing platform.

The Equipment Management (EM) subsystem 302 contains models of all external equipment that interface with the FMS. For instance, EM would contain models of radios, navigational sensors, an autopilot, and CDUs. All communication with the external equipment is to be managed using the services provided by the Equipment Management subsystem 302.

The overriding philosophy of the FMS with respect to EM, can be that it should provide a standard interface to a standard piece of equipment. That interface contains the services that are typically provided by equipment of this type and the interface is considered to be a part of the core product line. The implementation of the standard interface is then based on the physical equipment that is actually a part of the system.

There can be one other aspect of the services provided by a standard interface that merits discussion—required versus optional services. Because the philosophy of the core product line is to be reused verbatim, it will require that certain data be available. This necessitates the concept of standard interfaces to standard equipment. The fact that the standard interface provides services that are typical to that type of equipment, however, does not imply that every instance of that type of equipment actually does provide that service. For instance, there can be an INS that does not provide magnetic variation even though we consider that a typical service of an INS. If the core product line assumes that magnetic variation is provided by the standard INS, this poses a problem. On the other hand, if the core product line does not make use of the services provided by the standard interface to get magnetic variation, then it can not be a problem that the physical INS does not provide that data. Therefore, there are two classes of services provided by standard interfaces; required services and optional services. When the implementation of a standard interface is performed, for a specific project, there are some services within the standard interface that must be implemented and others that can be left unimplemented. Each standard interface will enumerate those services that are required and those that are optional. The determination of whether a service can be required or optional can be simply based on whether or not it can be used by the core product line.

It is important to note that the interfaces to standard equipment are generally logical models of that piece of equipment. Therefore, the interface might specify not only services that are provided by the equipment, but also higher-level services that are related to that equipment. One example of this additional functionality occurs within the VOR receiver interface. Generally, a physical VOR receiver is tuned by simply providing a frequency. Another model of the ideal VOR includes the identifier and position of the navaid to which the radio is tuned because that is important when we ultimately use the range and bearing information returned from the receiver to determine a position. Therefore, the service to tune the VOR receiver in the standard interface would include frequency, position, and ID.

Each service provided by the standard interfaces should contain not only the data to be conveyed, but also an indication of the validity of the signal. This can be especially important for services that provide data to the FMS Product Line applications from external equipment. For instance, an Air Data Computer interface can provide true airspeed to the applications. In addition to providing the airspeed value, the ADC interface should provide an indication of the validity of that airspeed value. The validity can be based on data freshness, physical equipment health, physical interface health, or any number of other criteria.

There are two aspects of input processing within this subsystem; the inputs that are received from higher subsystems and the inputs that are received from the interfaced equipment. For the former, data is generally destined for output to the interfaced equipment. Since this subsystem contains logical models of interfaced equipment, it is not necessary that every input from an application subsystem result in an output to equipment. For the latter, input data is gathered from the interfaced equipment and made available for access via the logical interface provided for each piece of equipment.

As with the input processing, there are two aspects of output processing. Those aspects are the reverses of the two aspects of input processing. Output data are sent to the interfaced equipment as required. The fact that data are made available to application subsystems, as described above, is another way of saying that the data is output from this subsystem.

The Redundancy Management subsystem 307 provides a backup contingency in the event that there is a failure of the processor hosting the system. The FMS Product Line operates in an active/standby (hot spare) configuration whereby one processor is actively executing the functionality of the system whilst the other processor is standing by, listening, ready to take over the active workload of the processor should it become necessary. The standby processor is listening and ready by virtue of periodic transfers of data from the active processor that will enable the standby processor to take over for the active processor and resume its work. The active/standby configuration assumes that the aircraft is wired such that the necessary data transfers can take place and that the processors can swap roles.

Redundancy Management 307 takes in indications of processor health to determine whether the active processor is fit to continue in its role. It also gathers up the data necessary to effect a reversal of processor roles and prepares it for transfer to the standby processor.

In addition to the transfer data, Redundancy Management outputs an indication as to whether the processors should exchange roles. The present invention takes advantage of both hot-spare and dual philosophies on various programs.

The Domain Services subsystem 308 provides a collection of common type definitions and primitive utilities that are used throughout the FMS Product Line system. The definitions provided by Domain Services are specifically related to the domain in which the system operates. It can be important to realize that the entities exported from this subsystem are not simply a collection of types that make it easy for implementers of the system. Rather, this subsystem provides services that are provided in the application domain. Examples of elements within Domain Services are types defining latitude and longitude, utilities to compute a distance between two points on the earth, and utilities to convert angular values between radians and degrees. All other systems within the FMS are expected to use these capabilities rather than define their own. This subsystem should never contain anything that is either platform or aircraft dependent; thus preventing the client systems from becoming dependent on the aircraft and platform. Domain Services take input parameters such as bearings, distances, and latitudes/longitudes and performs the requested processing on them, but none of the processing produces values that become resident in this subsystem. Outputs of Domain Services are type definitions universal to the FMS Product Line domain and computed values from utilities. None of the computed outputs are resident in this subsystem, but are merely returned to clients for their use.

The Operating System Services subsystem 303 can buffer the rest of the subsystems from the host computing environment such that the core application will not be dependent on any particular host or platform.

The input to the Operating System Services can be the Ada tasking model for the FMS. This model is translated into the underlying equivalent model of the platform, which can be independent of Ada tasks. The output of the Operating System Services can be the result of built-in-tests of the host computing environment in the form of a health indication. The FMS subsequently uses this health indication as a component in other health indications, for instance, the status of bus communications.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics as long as the principle, the presentation of a subsystem architecture for a flight management system, is followed. It is intended that the scope of the present invention be defined by the claims appended hereto.

The embodiments of an invention in which an exclusive property or right is claimed are defined as follows:

1. A flight management system (FMS) architecture residing on a computing platform, wherein the system is predicated on the enforcement of subsystem-dependency rules wherein a given subsystem can depend only upon another subsystem in the same or lower subsystems, the FMS architecture comprising:
   an operator interface subsystem for receiving input from an operator and presenting output to the operator;
   a communications subsystem for managing and interpreting communications to and from aircraft and equipment used for communication;
   a flight management subsystem for managing functions associated with operation of an aircraft; and
   a database management subsystem for managing and providing access to a plurality of databases housed within the FMS architecture.

2. The system of claim 1, wherein application functions in the communication, flight management and database subsystems are independent of the operator interface subsystem.

3. The system of claim 2, wherein the operator interface subsystem is modeled as a client at a top portion in a hierarchy while the rest of the application functions are at lower portions in the hierarchy.

4. The system of claim 1, wherein the application subsystems and the operator interface subsystem are independent of each other, thereby allowing the introduction of a new type of operator interface without affecting the underlying application.

5. The system of claim 1, wherein the subsystems are dependent upon the computing platform to access the external environment.

6. The system of claim 1, wherein subsystems are dependent upon the computing platform to access the external environment because the computing platform has a physical dependency upon aircraft wiring to affect the external systems.

7. The system of claim 1, wherein the equipment management subsystem provides a domain-level interface to the equipment upon which the performance of application functions is based.

8. The system of claim 1, wherein the Equipment Management Subsystem is responsible for implementing the high-level interface using the low-level facilities provided by the computing platform.

9. The system of claim 1, wherein the Equipment Management Subsystem has dependency on the computing platform.

10. The system of claim 1, wherein the communication subsystem has a dependency on the database management subsystem, equipment management subsystem, and computing platform services.

11. The system of claim 1, wherein the communication subsystem comprises voice and data transmissions capabilities.

12. The system of claim 1, wherein database access for the database management subsystem is provided to flight planning and aircraft guidance information.

13. A flight management system (FMS) for automating functions that flight crew performs during flight and for providing higher-level functions that are normally impractical for crew performance manually, comprising:
   an architecture housing an electronic flight plan, wherein,
      said architecture implements complex flight operations comprising Standard Instrument Departures (SID), Standard Terminal Arrivals (STAR), holding patterns, aerial refueling, and air drops,
      said architecture is configured as a layered subsystem hierarchy and is based on subsystem-dependency rules which allow a given subsystem to depend only upon another subsystem in the same or lower hierarchical layers, and
      said architecture communicates with aircrew interfaces; and
   an operator services module for allowing an operator using an aircrew interface to invoke services provided by the FMS, wherein, depending on the services invoked, the FMS can be required to obtain information from aircraft sensors and assume control of aircraft avionics if appropriate.

14. A method of controlling and coordinating communication between diverse modules in a flight management system (FMS), configured as a layered subsystem hierarchical architecture, the method comprising the steps of:
   coordinating communication between operational subsystems incorporated into the FMS based on subsystem-dependency rules which allow a given subsystem to depend only upon another subsystem in the same or lower hierarchical layers; and
   verifying communication based on the subsystem-dependency rules during implementation and execution of software associated with said modules.

15. The method of claim 14, wherein module operation is continuously checked against rules to ensure that module operation reflects module dependencies throughout the FMS mirroring corresponding real-world dependencies as defined by FMS subsystem-dependency rules.

16. A flight management system (FMS) including a layered-subsystem architecture residing on a computing platforms wherein the system is predicated on the enforcement of subsystem-dependency rules which allow a given subsystem to depend only upon another subsystem in the same or lower hierarchical layers, the FMS architecture comprising:
   an operator interface subsystem for receiving) input from an operator and presenting output to the operator;
   a communications subsystem for managing and interpreting communications to and from aircraft and equipment used for communication;
   a flight management subsystem for managing functions associated with operation of an aircraft; and
   a database management subsystem for managing and providing access to a plurality of databases housed within the FMS architecture.

17. The system of claim 16, wherein said communication, flight management and database subsystems each further comprise a plurality of application functions that are independent of the operator interface subsystem.

18. The system of claim 17, wherein the operator interface subsystem is modeled as a client at a top portion in a hierarchy while the communication, flight management and database subsystems are at lower portions in the hierarchy.

19. The system of claim 16, wherein the communication, flight management and database subsystems are independent from the operator interface subsystem, thereby allowing introduction of a new type of operator interface without affecting the communication, flight management and database subsystems.

20. The system of claim 16, wherein the operator interface, communication, flight management and database subsystems are dependent upon the computing platform to access an external environment.

21. The system of claim 16, wherein the computing platform has a physical dependency upon aircraft wiring to affect a plurality of aircraft systems.

22. The system of claim 16, further comprising an equipment management subsystem that provides a domain-level interface to a plurality of equipment upon which the performance of application functions within the operator interface, communication, flight management and database subsystems is based.

23. The system of claim 16, further comprising an equipment management subsystem that is responsible for implementing a high-level interface using a plurality of low-level facilities provided by the computing platform.

24. The system of claim 16, further comprising an equipment management subsystem that has a dependency on the computing platform.

25. The system of claim 16, further comprising a computing platform services subsystem.

26. The system of claim 25, wherein the communication subsystem has a dependency on the database management subsystem, equipment management subsystem, and computing platform services subsystem.

27. The system of claim 16, wherein the communication subsystem comprises voice and data transmissions capabilities.

28. The system of claim 16, wherein said navigation subsystem further comprises:

a flight planning subsystem to build and maintain a list of legs defining, a flight plan; and an aircraft guidance subsystem to guide an aircraft flight trajectory by producing steering commands and targets.

29. The system of claim 28, wherein database access from the database management subsystem is provided to said flight planning and aircraft guidance subsystems.

* * * * *